A. C. JOHNSON.
DRIVING AND REVERSING MECHANISM.
APPLICATION FILED APR. 23, 1919.
1,333,176.
Patented Mar. 9, 1920.
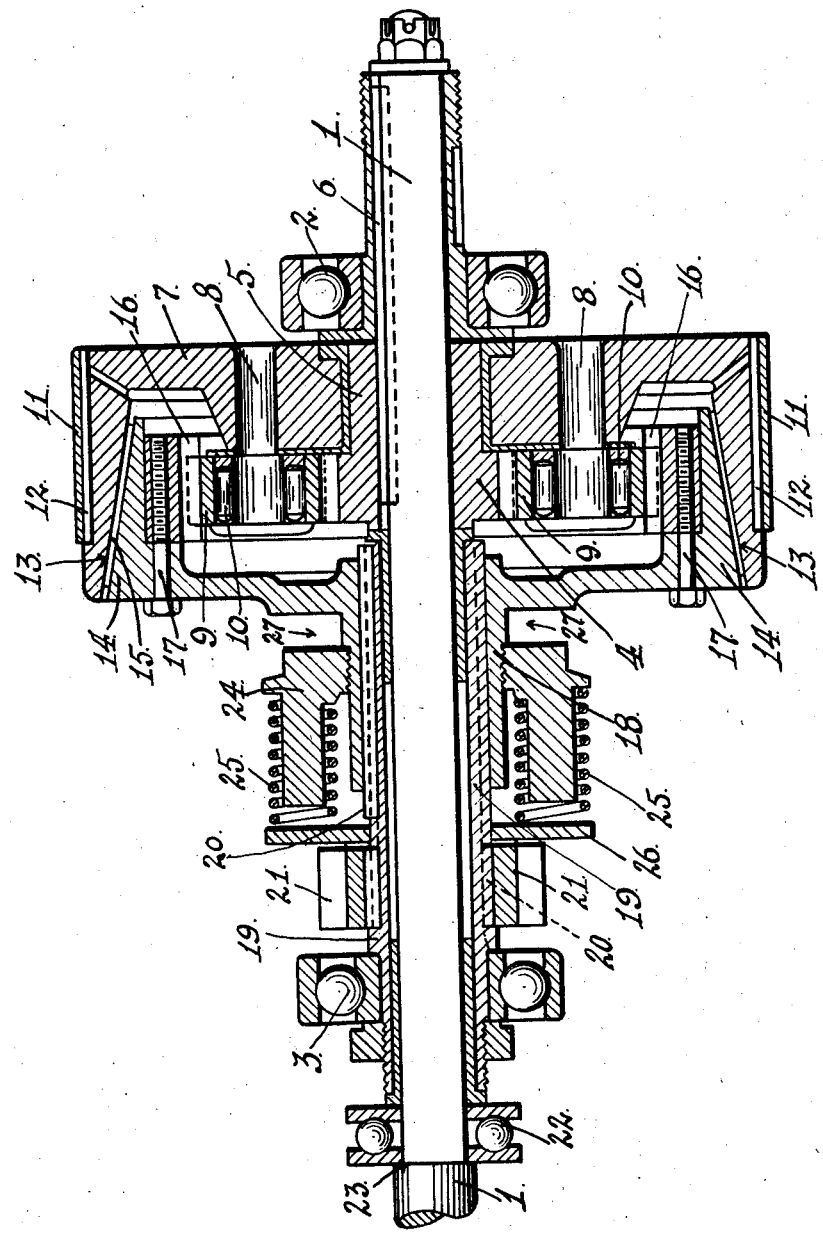
WITNESS
INVENTOR
Alfred C. Johnson
BY
Booth & Booth
ATTORNEYS

UNITED STATES PATENT OFFICE.

ALFRED C. JOHNSON, OF SAN JOSE, CALIFORNIA.

DRIVING AND REVERSING MECHANISM.

1,333,176.  Specification of Letters Patent.  Patented Mar. 9, 1920.

Application filed April 23, 1919. Serial No. 292,191.

*To all whom it may concern:*

Be it known that I, ALFRED C. JOHNSON, a citizen of the United States, residing at San Jose, in the county of Santa Clara and State of California, have invented certain new and useful Improvements in Driving and Reversing Mechanisms, of which the following is a specification.

My invention relates to a driving and reversing gear mechanism of the epicyclic or so-called planetary type.

The object of my invention is to provide a mechanism of the described type which is simple and inexpensive to manufacture, and in which the parts can readily be constructed with sufficient strength to withstand the strains imposed upon them by the hardest service, without being unduly heavy or cumbersome.

As described hereinafter and illustrated herewith, my reversing gear mechanism is particularly suitable for use in internal combustion engine driven tractors, although it is to be understood that my device is equally well adapted to any of the uses in which a reversing gear of this type may be employed.

With this in view my invention will be hereinafter fully described with reference to the accompanying drawing, wherein is shown a longitudinal central section of my driving and reversing gear mechanism.

In the drawing, the reference numeral 1 designates a driving shaft, extending through the entire mechanism, and supported in suitable bearings 2 and 3. Power may be applied to the said driving shaft 1, at either end thereof, by any desired means not shown in the drawing.

A driving pinion 4, having a laterally extended hub 5, is mounted upon the shaft 1 between its supporting bearings 2 and 3, and is secured to said shaft, and caused to rotate therewith, by means of a key 6. A drum 7 is rotatably mounted upon the hub 5 of the pinion 4, and said drum carries a series of studs 8, disposed concentrically about and parallel with the axis of the drum. In the drawing I have shown two of such studs, but it is understood that any number consistent with good mechanical practice may be employed. The said studs 8 carry rotatable idler pinions 9, shown in the drawing as mounted upon roller bearings 10, and said pinions mesh with the driving pinion 4.

The drum 7 is formed upon its periphery with a cylindrical surface adapted to be gripped by an encircling or partially encircling shoe or band 11, the said band being lined with some suitable friction material 12. Moreover, the drum 7 is formed with a concentric female cone 13, adapted for engagement by a male cone member 14, the latter being faced with leather or other suitable material shown at 15.

The male cone member 14 carries a ring gear 16, with internally cut teeth adapted for constant engagement with the teeth of the idler pinions 9. The said internal ring gear, which is shown as secured to the male cone member 14 by means of cap screws 17, is wider than the idler pinions 9, so that the full length of the teeth of said idler pinions remains in contact with the teeth of said internal ring gear when the male cone member 14 is withdrawn from its engagement with the female cone 13.

The male cone member 14 is carried upon a hub 18, which is slidably mounted upon a driven sleeve 19 surrounding the driving shaft 1. Said driven sleeve 19 is free to rotate upon the driving shaft 1, but is caused to rotate with the slidably mounted hub 18 of the male cone member 14 by means of splines or keys 20. A driven pinion 21 is fixed to the driven sleeve 19 near its outer end, and it is understood that this pinion represents any means for leading off the power from the sleeve 19, which power may be taken by any suitable gearing not shown in the drawing. The sleeve 19 is extended beyond the driven pinion 21, and a thrust bearing 22 is provided between the end of said sleeve and a shoulder 23 on the driving shaft 1.

The main shaft bearing 3 is mounted upon said sleeve 19, said sleeve forming a bearing support for that end of the driving shaft 1.

The hub 18 of the male cone member 14 is provided with a spider 24 carrying springs 25, two of which are shown in the drawings, said springs abutting against a thrust collar 26 carried upon said hub. The action of said springs, as will be readily understood, forces the male cone member 14 into engagement with the female cone 13. The male cone member may be withdrawn from such engagement, at will, by any suitable mechanism, not shown in the drawing, operating preferably within a groove 27.

The operation of my driving and reversing gear mechanism will be readily understood from the foregoing description.

When the cone members 13 and 14 are mutually engaged, the entire mechanism rotates as a whole, and power is transmitted from the driving shaft 1 to the driven gear 21 without change in direction or speed; but when the said cone members are disengaged, and the drum 7 is held stationary by the band 11, power is transmitted through the driving pinion 4, the idler pinions 9, and the internal gear 16, so that the driven gear 21 then rotates in a direction opposite to, and at a rate of speed slower than that of the driving shaft 1. If both the band 11 and the cone member 14 be disengaged from the drum 7, no power is transmitted to the driven gear 21.

It will be seen that, by forming the female cone within the drum 7, and by mounting the internal gear 16 directly upon the male cone member 14, I am enabled to construct the reversing gear with the least possible number of parts. This mounting of the internal gear directly upon the male cone member is rendered practicable by the use of an internal gear having a face of greater width than that of the idler pinions 9, so that said internal gear may slide upon said pinions, in a direction parallel with their axes, without disengaging any portion of the teeth of said pinions.

The reduced speed of the driven gear 21, when driven in the reverse direction, renders my reversing gear particularly suitable for use in connection with traction engines, for the reason that in the design of such machines, it is highly desirable, from considerations of safety and ease of control, to provide for a reduction in speed when operating in the reverse direction. Moreover, by extending the driving shaft 1 through the entire mechanism, not only am I enabled to provide adequate bearing supports for all moving parts, but the extending end of the said drive shaft may be used for other power purposes, as, for example, and as is highly desirable in tractor design, the mounting of a pulley for driving other outside devices by means of a belt.

I claim:—

1. An epicyclic driving and reversing mechanism comprising a driving shaft; a drum mounted rotatably about said shaft; a driving gear fixed upon said shaft; a driven internal gear mounted slidably and rotatably about said shaft concentrically with respect to said driving gear; a pinion carried by said drum and positioned for engagement with both said driving gear and said driven internal gear; means carried by said driven internal gear for engaging said drum, when moved longitudinally upon the shaft, in positive power-transmitting relation; and means for holding said drum, at will, against rotation.

2. An epicyclic driving and reversing mechanism comprising a driving shaft; a drum mounted rotatably about said shaft; a driving gear fixed upon said shaft; a driven internal gear mounted slidably and rotatably about said shaft concentrically with respect to said driving gear; a pinion carried by said drum and positioned for engagement with both said driving gear and said driven internal gear; a friction clutch, the driving member thereof carried by said drum and the driven member by said driven internal gear; means for sliding said internal gear longitudinally upon said shaft to engage said clutch, at will; and means for holding said drum, at will, against rotation.

3. An epicyclic driving and revesing mechanism comprising a driving shaft; a drum mounted rotatably about said shaft; said drum having a friction driving member; a driving gear fixed upon said shaft; a driven internal gear slidably and rotatably mounted about said shaft, said driven internal gear having a friction driven member adapted to engage said friction driving member; a pinion carried by said drum and positioned for engagement with both said driving gear and said driven internal gear; and means for holding said drum, at will, against rotation.

4. An epicylic driving and reversing mechanism comprising a driving shaft; a drum mounted rotatably about said shaft, said drum having a friction driving member; a driving gear fixed upon said shaft, a driven internal gear slidably and rotatably mounted about said shaft, and positioned concentric with and in the plane of said driving gear, and having a face of greater width than that of said driving gear; a friction driven member carried by said driven internal gear, and adapted to engage said friction driving member; a pinion carried by said drum and positioned for constant engagement both with said driving gear and said driven internal gear; and means for holding said drum, at will, against rotation.

5. An epicyclic driving and reversing mechanism comprising a driving shaft extending through the entire mechanism; a driving gear fixed upon said shaft; a drum rotatably mounted about said shaft, said drum having a friction driving member; a driven member slidably and rotatably mounted about said shaft, said driven member being adapted for frictional engagement with said drum; an internal gear carried by said driven member in fixed relation thereto; a pinion carried by said drum and positioned for constant engagement both with said driving gear and said internal gear; and means for holding said drum, at will, against rotation.

6. An epicyclic driving and reversing mechanism comprising a driving shaft; a driving gear fixed upon said shaft; a drum rotatably mounted about said shaft, said drum being provided with a friction driving member comprising a female cone; a driven sleeve rotatably mounted upon said shaft; a driven member slidably mounted upon said sleeve, said member being provided with a male cone adapted to frictionally engage the female cone of said driving member; a spring for normally retaining said conical members in driving relation; an internal gear carried by said driven member in fixed relation thereto; a pinion carried by said drum and positioned for constant engagement both with said driving gear and said internal gear; and means for holding said drum, at will, against rotation.

In testimony whereof I have signed my name to this specification in the presence of two subscribing witnesses.

ALFRED C. JOHNSON.

Witnesses:
WM. F. BOOTH,
WILLIAM F. BOOTH, Jr.